United States Patent [19]

Purcell

[11] Patent Number: 4,513,769
[45] Date of Patent: Apr. 30, 1985

[54] METHOD OF MANUFACTURING FAUCETS AND SPOUTS, FAUCET INSERTS, AND FAUCETS AND SPOUTS MANUFACTURED BY THE METHOD

[75] Inventor: Glenn T. Purcell, El Paso, Ill.

[73] Assignee: Masco Corporation of Indiana, Taylor, Mich.

[21] Appl. No.: 392,887

[22] Filed: Jun. 28, 1982

[51] Int. Cl.³ ............................................. F16K 43/00
[52] U.S. Cl. ..................................... 137/315; 137/359;
 137/606; 137/454.5; 137/801; 251/367;
 251/368; 251/DIG. 1; 277/183; 277/186;
 29/157.1 R
[58] Field of Search ...................... 137/315, 359, 606;
 251/367, 368; 4/192; 277/183, 184, 186, 178;
 220/4 B, 4 E

[56] References Cited

U.S. PATENT DOCUMENTS

| | | | |
|---|---|---|---|
| 2,053,210 | 9/1936 | Southgate | 137/359 |
| 2,591,991 | 4/1952 | Young | 137/606 X |
| 2,681,142 | 6/1954 | Cohen | 220/4 E X |
| 2,737,202 | 3/1956 | Baldwin | 251/367 X |
| 2,869,221 | 1/1959 | Siepmann | 251/367 X |
| 3,190,306 | 6/1965 | Staat | 137/359 X |
| 3,232,308 | 2/1966 | Moen | 251/367 X |
| 3,286,733 | 11/1966 | Hunter | 251/367 X |
| 3,448,768 | 6/1969 | Keller | 251/368 X |
| 3,630,223 | 12/1971 | Schaverien | 251/368 X |
| 3,790,966 | 2/1974 | Keane | 4/192 |
| 3,911,946 | 10/1975 | Humpert | 137/606 X |
| 4,111,395 | 9/1978 | Sheppard | 251/367 X |

Primary Examiner—Harold W. Weakley
Attorney, Agent, or Firm—Steven L. Permut; Malcolm L. Sutherland; Leon E. Redman

[57] ABSTRACT

A method of manufacturing faucets and spouts, faucet inserts and faucets and spouts manufactured by the method. The faucet or spout includes an upper housing plate and a lower housing plate, a peripheral flange being provided on each of the housing plates such that the flanges mate with a seal disposed betweem them in fluid sealing relationship, the housing plates having spaced apart surfaces extending from their respective flanges to define a chamber. The faucet inserts include a valving member rotatably received within a housing member, the housing member having an internal conical surface adapted for mating engagement with an external conical surface of the valving member, the valving member having a port adapted to be reversibly aligned and misaligned with a port in the housing member for selectively allowing and shutting off fluid flow. The method includes stamping a pair of housing plates having respective male and female interfitting flanges, applying a continuous fluid seal to the outside of the male flange and inserting the male flange inside the female flange until the seal is in contact with both of the housing plates, and folding the female flange reversely inwardly about the male flange to secure the housing plates together. With this arrangement, a faucet or spout can be made utilizing the method of the invention.

25 Claims, 18 Drawing Figures

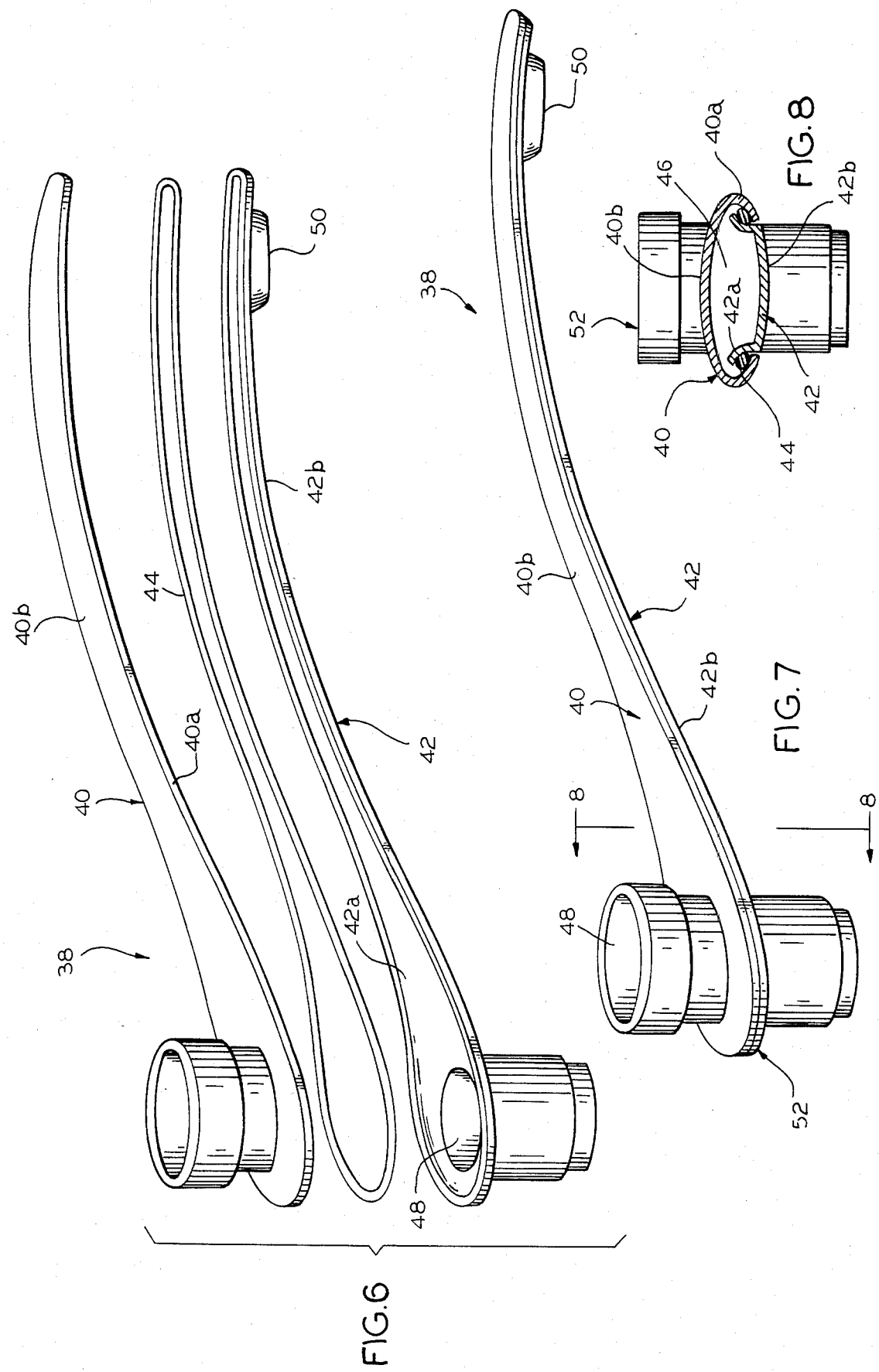

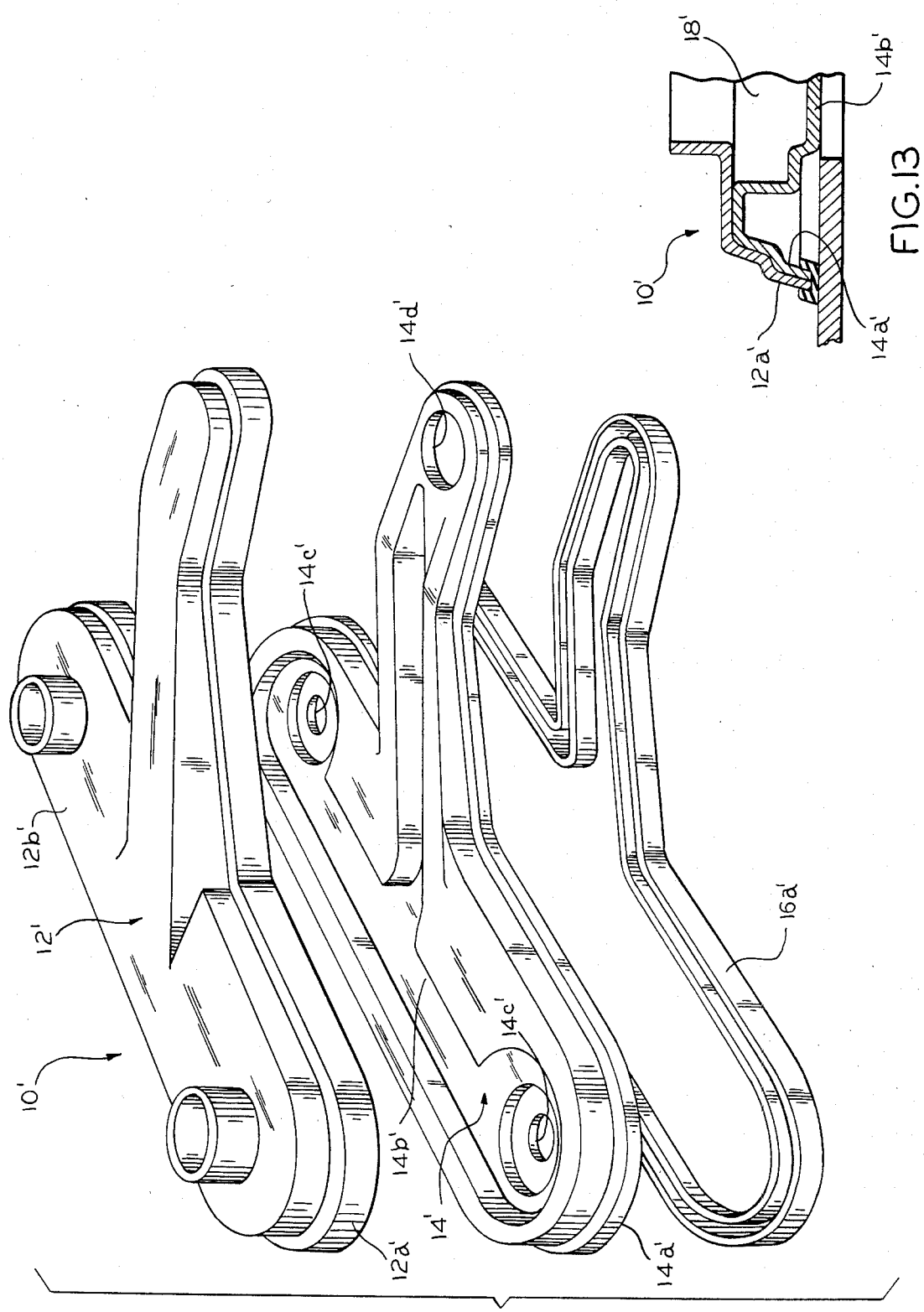

METHOD OF MANUFACTURING FAUCETS AND SPOUTS, FAUCET INSERTS, AND FAUCETS AND SPOUTS MANUFACTURED BY THE METHOD

BACKGROUND OF THE INVENTION

The present invention relates to a method of manufacturing faucets and spouts, faucet inserts, and faucets and spouts manufactured by the method and, more particularly, to a method, insert, faucet and spout that are unique, inexpensive and effective for the intended purpose.

In recent years, it has become commonplace to utilize pressed metal sinks in a wide range of applications. Such sinks have provided numerous significant advantages including a substantial reduction in weight, a concomitant reduction in cost as well as a reduction in the cost of installation thereof, and a substantial savings in the metal used for each sink. Additionally, pressed metal sinks are manufactured by mass production techniques.

While there have been advancements in modern sinks, faucets and spouts have remained substantially unchanged over the years. Specifically, faucets and spouts which are presently available on a commercial scale have not followed the lead of modern sinks and, as a result, there has been no means for substantially reducing the cost of faucets and spouts, no means for saving the metal used in faucets and spouts, and no means for utilizing mass production techniques in the manufacture of faucets and spouts. On the contrary, faucets and spouts have continued to be made from sand brass castings and plastics which are machined and shaped to size along with brass screw machine components, for the most part.

Because of this, faucets and spouts have been relatively expensive to manufacture. The manufacturing techniques required also are quite time consuming and have used excessive amounts of relatively scarce metal because of the thick wall sections incident to the manufacture of castings and the numerous machining operations required thereby. Accordingly, faucets and spouts have continued to be manufactured by utilizing the techniques first employed many years ago.

It is therefore an object of the present invention to provide entirely new methods of manufacturing faucets and spouts, faucet inserts, and faucets and spouts manufactured by the methods departing from those previously available.

It is another object of the present invention to provide methods of manufacturing faucets and spouts, faucet inserts, and faucets and spouts manufactured by the methods that are reduced in cost, save metal, and utilize mass production techniques.

It is also an object of the present invention to provide methods of manufacturing faucets and spouts, faucet inserts, and faucets and spouts manufactured by the methods that eliminate the need for utilizing sand brass castings which are machined and shaped to size.

It is a further object of the present invention to provide methods of manufacturing faucets and spouts, faucet inserts, and faucets and spouts manufactured by the methods which eliminate the need for utilizing brass machine components which are expensive to manufacture.

Still another object of the present invention is to provide methods of manufacturing faucets and spouts, faucet inserts, and faucets and spouts manufactured by the methods which utilize stamped faucet housing plates.

These and other objects, advantages and features of the present invention will become apparent from the following description when considered in connection with the accompanying drawings.

SUMMARY OF THE INVENTION

In general, the objects and advantages of the present invention are met by providing entirely new methods of manufacturing faucets and spouts, faucet inserts and faucets and spouts manufactured by the methods. The faucet or spout includes a stamped upper housing plate and a stamped lower housing plate. A peripheral flange is provided on each of the housing plates such that the flanges meet with a seal disposed between them in fluid sealing relationship. The housing plates have spaced apart surfaces extending from their respective flanges to define a chamber. An opening leads into the chamber to define a fluid inlet and an opening leads out of the chamber to define a fluid outlet. Additionally, a faucet also includes externally manipulable means for selectively controlling fluid flow through the chamber.

The faucet insert includes a housing member adapted to be positioned within a faucet, the housing member having an opening extending therethrough and defining an internal conical surface, the housing member also having port means providing communication between the opening and a fluid passageway in the faucet. A valving member is also provided which is rotatably received within the opening in the housing member, the valving member having an external conical surface adapted for mating engagement with the internal conical surface of the housing member and having a flow impact cavity communicating with a fluid inlet for the faucet, the valving member also having port means providing communication between the flow impact cavity and the port means in the housing member. The faucet insert further includes a stem on the valving member extending through the opening in the housing member, the stem being adapted for non-rising rotation to reversibly align and mis-align the port means in the valving member with the port means in the housing member, the valving member thereby selectively allowing and shutting off fluid flow through the faucet.

The method includes stamping a pair of housing plates having respective male and female interfitting flanges. A continuous fluid sealing means is then applied to the outside of the male flange and the male flange is inserted inside the female flange until the sealing means is in contact with both of the housing plates. Finally, the method includes folding the female flange reversely inwardly about the male flange to secure the pair of housing plates together.

In a preferred embodiment of faucet, the upper and lower housing plates are sized relative to one another such that the male and female engagement is an interference press fit. It is also contemplated that the mating peripheral flanges of the upper and lower housing plates will have parallel straight portions offset by conformably bent intermediate portions. With this arrangement, the seal means preferably comprises the use of semi-liquid adhesives or bonding sealants between the conformably bent intermediate portions to form a fluid tight seal.

BRIEF DESCRIPTION OF THE DRAWINGS

In the drawing:

FIG. 6 is an exploded perspective view of a spout manufactured in accordance with the present invention;

FIG. 7 is a perspective view of the spout after completing assembly thereof;

FIG. 8 is a cross sectional view taken on the line 8—8 of FIG. 7;

FIG. 12 is an exploded perspective view of an alternative faucet with integral spout manufactured in accordance with the present invention;

FIG. 13 is a cross sectional view illustrating the peripheral flanges of the upper and lower faucet housing plates after completing assembly of the alternative faucet;

DETAILED DESCRIPTION OF THE PREFERRED EMBODIMENT

Figure 1:
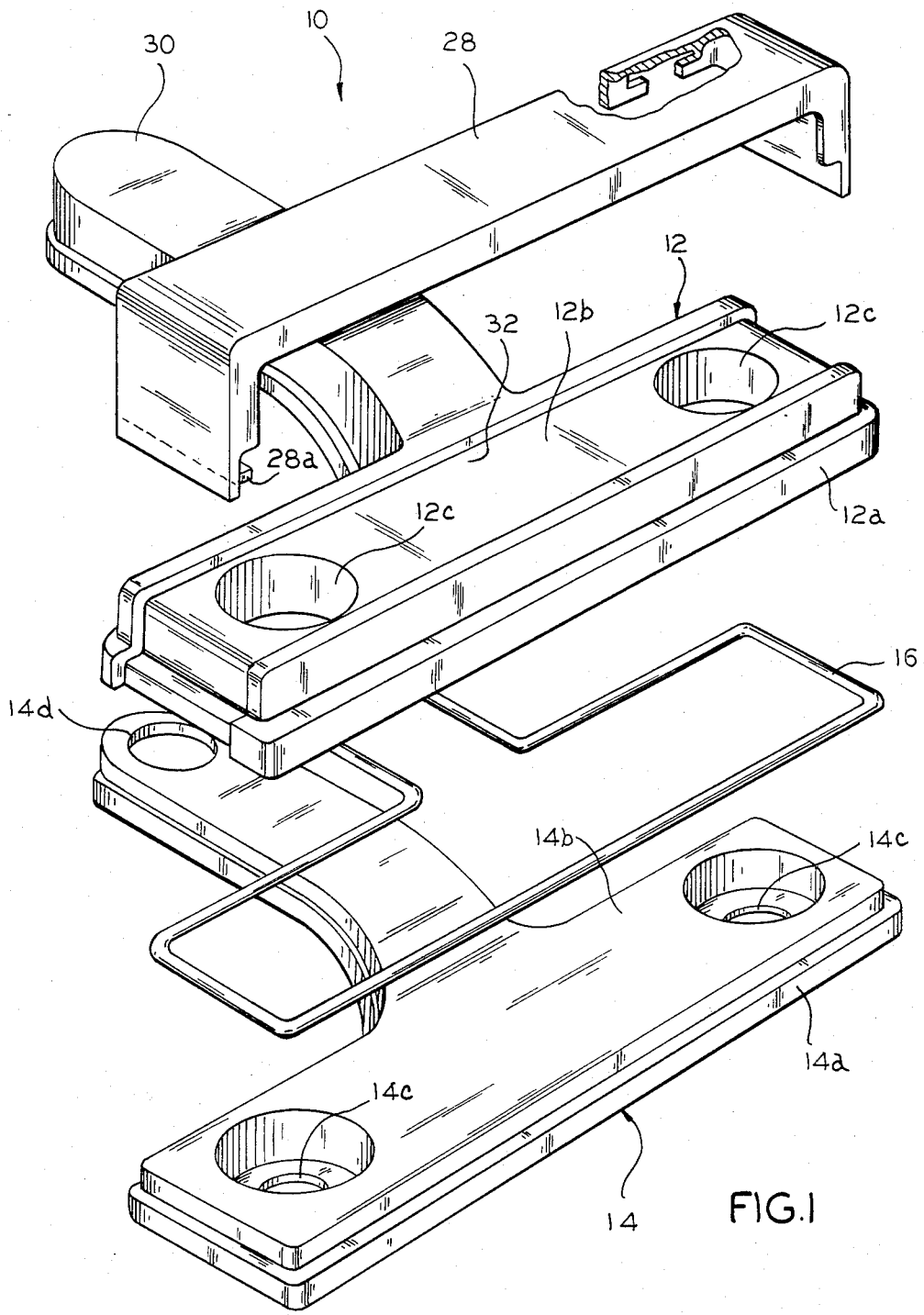
FIG. 1 is an exploded prespective view of a faucet with integral spout manufactured in accordance with the present invention.

Referring to the drawings, and first to FIG. 1, the reference numeral 10 designates generally a faucet in accordance with the present invention. The faucet 10 includes a stamped or formed upper housing plate 12 and a stamped or formed lower housing plate 14. A peripheral flange 12a and 14a is provided on each of the housing plates 12 and 14, respectively, with flanges 12a and 14a mating with a seal or sealant 16 disposed between them in fluid sealing relationship. The housing plates 12 and 14 have spaced apart surfaces 12b and 14b, respectively, extending from the flanges 12a and 14a to define a chamber 18 (see FIG. 3b). An opening 14c leads into the chamber 18 to define a fluid inlet and an opening 14d leads out of the chamber to define a fluid outlet. The faucet 10 further includes externally manipulable means, such as handle 22, for selectively controlling fluid flow through the chamber 18 (see FIG. 5).

As shown in FIG. 1, the housing plates 12 and 14 include juxtaposed openings 12c and 14c in communication with the chamber 18. The handle 22 is disposed adjacent one of the openings 12c in the housing plate 12 and a fluid line 24 is disposed in fluid sealing relationship with the other of the openings 14c in the housing plate 14 (see FIG. 5). Moreover, the handle 22 and the fluid line 24 are operatively associated by means of a valve assembly 26 disposed in communication with the chamber 18.

As will be appreciated, the peripheral flanges 12a and 14a are originally formed for being press fit into intimate association to establish a fluid tight seal. The seal or sealant 16 between the peripheral flanges 12a and 14a which serves to establish the fluid tight seal can be any of a number of different types of sealing means including, but not limited to, a semi-liquid adhesive or bonding material applied between the peripheral flanges and having a surface tension sufficient to remain between the peripheral flanges after being applied to fill the space therebetween (which is the preferred form of sealing) or a resilient element such as an endless elastic "O" ring (as shown for clarity of illustration) which is sized and positioned so as to be compressed between the peripheral flanges, or by brazing the peripheral flanges 12a and 14a together. With the housing plates 12 and 14 comprising mating halves having male and female engagement one with the other at the peripheral flanges 12a and 14a, the housing plates are advantageously sized relative to one another such that the male and female engagement is an interference press fit on the order of about 0.002 to 0.005 inches.

Figure 5:
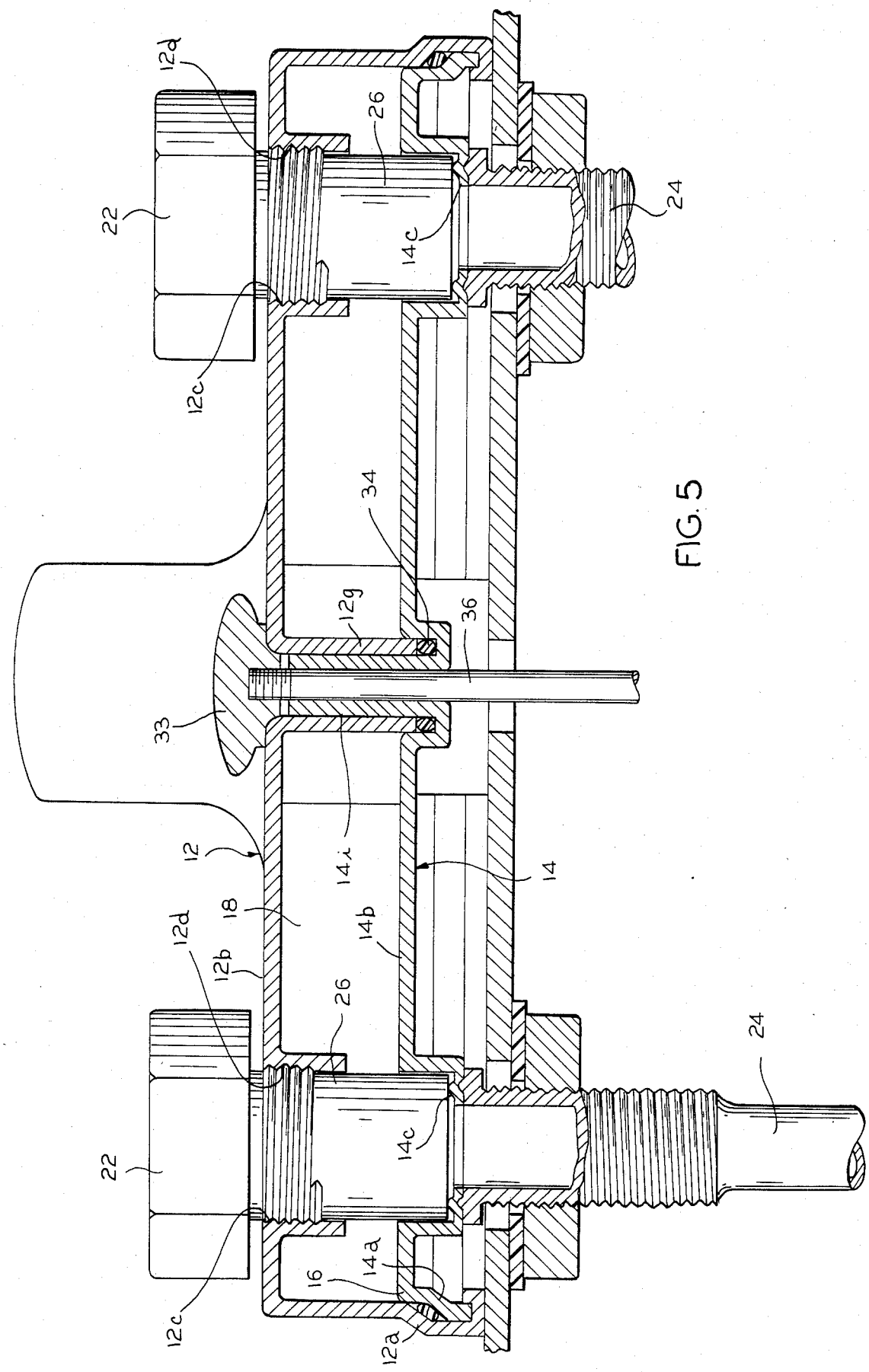
FIG. 5 is a cross sectional view of an installed faucet with integral spout manufactured in accordance with the present invention.

As shown best in FIGS. 1 and 5, the openings 12c and 14c in the housing plates 12 and 14, respectively, are defined by annular flanges stamped out of the respective surfaces 12b and 14b. The annular flanges are downturned from the surfaces 12b and 14b of the housing plates 12 and 14 and are spaced, one to the other, as shown in FIG. 5, when the faucet 10 is fully assembled. With this arrangement, one of the annular flanges is suitably threaded, such as at 12d, to threadingly receive the valve assembly 26 therein.

Figures 2A, 2B:
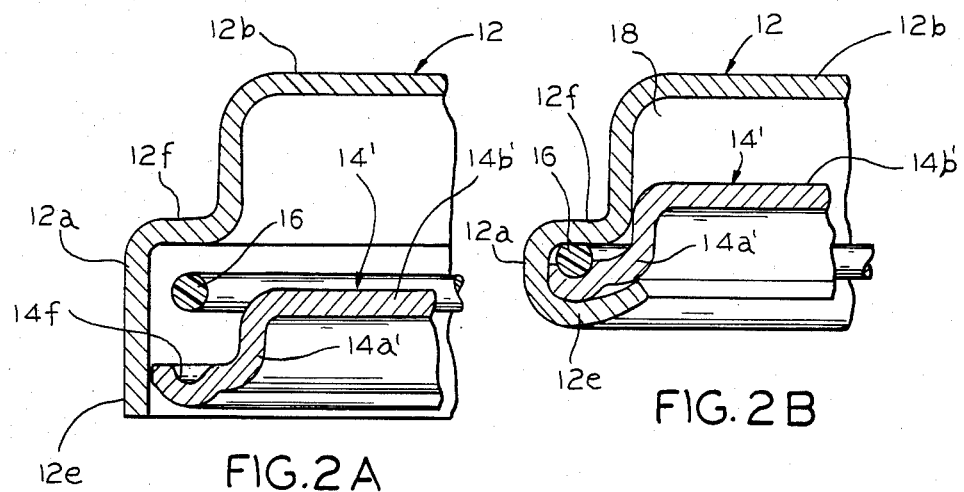
FIG. 2a is a cross sectional view illustrating the peripheral flanges of the upper and lower faucet housing plates prior to completing assembly of the faucet.
FIG. 2b is a cross sectional view illustrating the peripheral flanges of the upper and lower faucet housing plates after completing assembly of the faucet.
Figures 3A, 3B:
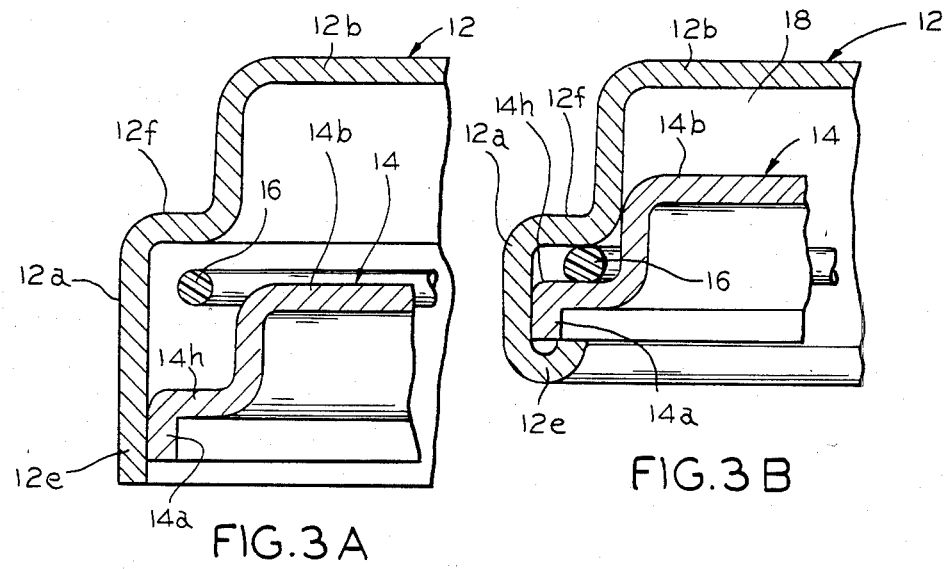
FIG. 3a is a cross sectional view illustrating the peripheral flanges of an alternative embodiment of upper and lower faucet housing plates prior to completing assembly of the faucet.
FIG. 3b is a cross sectional view illustrating the peripheral flanges of the alternative embodiment of upper and lower faucet housing plates after completing assembly of the faucet.

Referring to FIGS. 2a, 2b, 3a, 3b, 4a, 4b, and 5, it will be appreciated that an important common feature is a lip on one of the peripheral flanges adapted to be folded over the other peripheral flange. Referring, for instance, to FIGS. 3a and 3b, the peripheral flange 12a includes a lip 12e and, as shown in FIG. 3b, the lip 12e is adapted to be folded over the peripheral flange 14a whereby the upper and lower housing plates 12 and 14, respectively, are secured together. As shown, this is accomplished in a manner providing a fluid tight seal, either with a semi-liquid adhesive or bonding material, or by compressing the seal 16 therebetween.

Referring to FIGS. 2a and 2b, the construction of the peripheral flanges is somewhat different. It will be seen that the peripheral flange 12a is identical to the peripheral flange illustrated in FIG. 3a, i.e., it comprises a downturned margin on the upper housing plate 12, but the peripheral flange 14a' is quite different from the peripheral flange 14a illustrated in FIG. 3a in that it includes a mating, upturned margin having a recess 14f on the lower housing plate 14' adapted to receive the seal 16 therein in a manner in which the lip 12e is adapted to be folded over the upturned margin to secure the housing plates 12 and 14 together. With this arrangement, the seal 16 is compressed between the faucet housing plates 12 and 14 within the recess 14f.

Figures 4A, 4B:
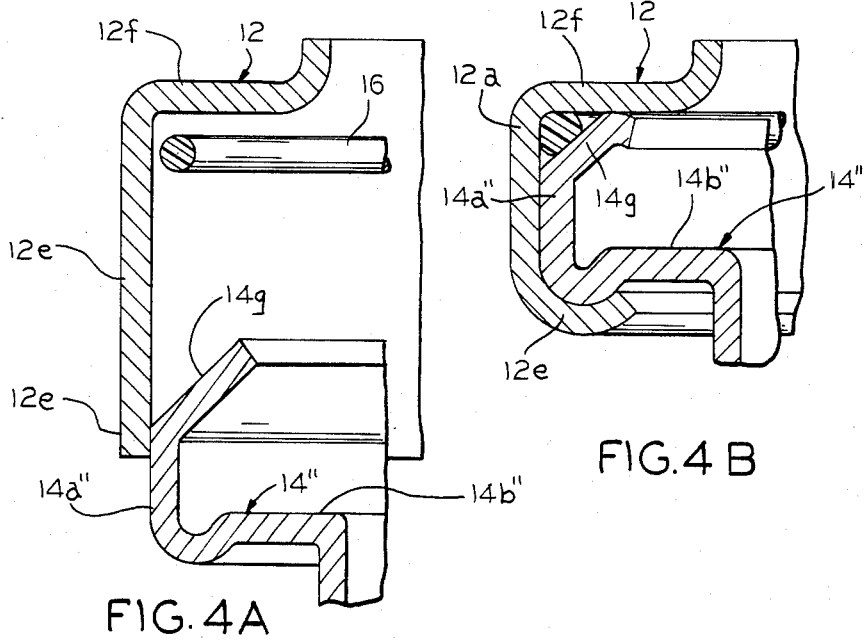
FIG. 4a is a cross sectional view of the peripheral flanges of another alternative embodiment of upper and lower faucet housing plates prior to completing assembly of the faucet.
FIG. 4b is a cross sectional view illustrating the peripheral flanges of the other alternative embodiment of upper and lower faucet housing plates after completing assembly of the faucet.

Referring to FIGS. 4a and 4b, the peripheral flange 12a is again substantially identical to the peripheral flange illustrated in FIG. 3a. Once again, however, the peripheral flange 14a" on the lower housing plate 14" is quite different in that it includes a parallel perimeter portion terminating in an inwardly directed angular seal engaging portion 14g. With this arrangement, the lip 12e is adapted to be folded over the peripheral flange 14a" in a fashion forcing the seal engaging portion 14g to compress the seal 16 between the housing plates 12 and 14".

Preferably, the exposed surface of at least the upper housing plate 12 is prefinished. The prefinished surface can be polished, plated, painted, enameled or vinyl clad, by way of example. Alternatively, the exposed surface of at least a portion of the upper housing plate 12 can be covered by means of a cover plate 28 (see FIG. 1).

If the cover plate 28 is used, the cover plate may be prefinished, for instance, differently than the upper housing plate 12. This provides an aesthetically pleasing faucet which can be color coordinated by decorators and, with the cover plate 28 constructed of a material capable of being expanded over and releasably held to the upper housing 12, it is a simple matter to select a cover plate 28 of a desired color and/or to replace the cover plate 28 with others of a different color at will. While not shown, those skilled in the art will appreciate that the cover plate 28 will be provided with suitable openings mating with the openings 12c.

Referring to the peripheral flanges illustrated throughout the drawings, it will be appreciated that the respective mating flanges of the upper and lower housing plates all have parallel straight portions offset by conformably bent portions. The seal 16 is disposed in each instance between the conformably bent portions and the straight portions are engaged in press fit relationship as previously described. Additionally, one of the peripheral flanges 12a has a lip 12e in each case with the lip 12e being folded over the other of the peripheral flanges such as 14a, 14a' and 14a".

Referring once again to FIG. 1, it will be seen that the faucet 10 includes an integral spout 30. The fluid outlet 14d is formed near the end of the spout 30 in the lower housing plate 14 at a point remote from the remainder of the faucet and, as will be appreciated from the drawings, the upper and lower housing plates 12 and 14 are stamped such that the spout 30 is not only integral with the remainder of the faucet 10 but is also in direct communication with the chamber 18 so that fluid flowing into the chamber will flow through the spout 30 for discharge through the fluid outlet 14d. Moreover, the peripheral flanges 12a and 14a extend completely about the faucet 10, including the spout 30, defined by the spaced apart surfaces 12b and 14b.

Still referring to FIG. 1, it will be appreciated that there is a suitable recess 32 in the upper housing plate 12 adapted to receive the cover plate 28. The cover plate 28 is also preferably provided with inwardly projecting fingers 28a to engage in a suitable recess (not shown) or to fasten under or otherwise cooperate with the faucet 10 to secure the cover plate to the faucet. As previously mentioned, the cover plate 28 is constructed of a material capable of being expanded over and releasably held to the upper faucet housing plate 12.

Referring to FIGS. 2a and 2b, it will be seen that the peripheral flange 12a includes an offset shoulder portion 12f located in conformity with the recess 14f and the peripheral flange 14a'. The seal 16 is compressed between the offset shoulder portion 12f and the recess 14f to form a fluid tight seal for the chamber 18. Referring to FIGS. 3a and 3b, the peripheral flange 12 again includes an offset shoulder portion 12f located in conformity with an offset shoulder portion 14h of the peripheral flange 14a. The seal 16 is compressed between the offset shoulder portions 12f and 14h to form a fluid tight seal for the chamber 18. Referring to FIGS. 4a and 4b, the peripheral flange 12a still again includes an offset shoulder portion 12f located in conformity with the angular seal engaging portion 14g of the peripheral flange 14a". The seal 16 is compressed between the peripheral flange 12a and the angular seal engaging portion 14g in the corner where the offset shoulder portion 12f intersects with the straight portion of the peripheral flange 12a. Moreover, the peripheral flanges illustrated in FIG. 5 represent only a minor variation of the peripheral flanges illustrated in FIGS. 3a and 3b.

As shown in FIG. 5, the faucet 10 includes a handle 33 for controlling a drain stopper (not shown). It will be seen that the upper housing plate 12 then includes a downturned flange portion 12g which rests against a seal 34 in an annular recess defined by an intially downturned and then upturned flange portion 14i of the lower housing plate 14. With this arrangement, the handle 33 can be connected to the drain mechanism by means of a threaded stem 36.

Referring to the peripheral flanges of the upper and lower housing plates illustrated in FIG. 5, it will be appreciated that they are nearly identical to the peripheral flanges 12a and 14a of FIGS. 3a and 3b. The principal difference is that the peripheral flanges of FIG. 5 include outwardly and downwardly directed shoulder portions rather than the substantially horizontal shoulder portions illustrated in FIGS. 3a and 3b. Additionally, the lip formed by the end of the peripheral flange associated with the upper housing plate 12 is bent at substantially right angles rather than on a smooth curve.

While the description has referred to single openings 12c and 14c, it will be appreciated that there are oftentimes a pair of such openings in a given faucet. FIGS. 1 and 5 illustrate a pair of the respective openings together with the associated handles 22, fluid inlet lines 24, and valve assemblies 26 threadingly engaged within the openings 12c by means of the threads 12d. However, those skilled in the art will appreciate that the features of the invention are equally applicable to a single handled faucet, as well.

Referring to FIGS. 12 and 13, a faucet 10' of plastic or any other non-ferrous material construction is illustrated. The faucet 10' includes a formed upper housing plate 12' and a formed lower housing plate 14'. A peripheral flange 12a' and 14a' is provided on each of the housing plates 12' and 14', respectively, with flanges 12a' and 14a' mating with a seal 16' disposed about them in fluid sealing relationship. The housing plates 12' and 14' have spaced apart surfaces 12b' and 14b', respectively, extending from the flanges 12a' and 14a' to define a chamber 18' (see FIG. 13). An opening 14c' leads into the chamber 18' to define a fluid inlet and an opening 14d' leads out of the chamber to define a fluid outlet. The faucet 10' further includes externally manipulable means, such as a handle (not shown), for selectively controlling fluid flow through the chamber 19'.

With the upper and lower housing plates 12' and 14' constructed of plastic or any other non-ferrous material, the peripheral flanges 12a' and 14a' are preferably sized to permit an interference fit. The lower housing plate 14' may then be pressed into the upper housing plate 12' and a seal may be formed, by way of example, by ultrasonic welding or chemical adhesive means. When this has been done, the seal 16' may be pressed over the ends of the ultrasonically welded peripheral flanges 12a' and 14a' (in this instance the seal 16' comprising a continuous channel) after which the seal 16' may be sealed in place, e.g., by heat crimping.

As will be appreciated, the exact construction of the faucet 10' differs somewhat from the earlier described faucet 10. A faucet constructed in accordance with the present invention may take any of a wide variety of forms, as the differences apparent from the drawings suggest, due to the versatility inherent in being able to either stamp the components of metal or form the components of plastic. As a result, it will readily be appreciated by those skilled in the art that the constructions shown are merely by way of example.

With an understanding that faucets and spouts are oftentimes independently manufactured as separate entities in the industry, an additional aspect of the present invention is the applicability of the concept to the construction of a spout. FIGS. 6 through 8 illustrate a spout 38 in some detail. The spout 38 includes a stamped upper housing plate 40 and a stamped lower housing plate 42. A peripheral flange 40a and 42a is provided on each of the housing plates 40 and 42 such that the flanges 40a and 42a mate with a seal 44 disposed between them in fluid sealing relation. It will again be appreciated that the seal may be formed from a semi-liquid adhesive or bonding material (which is the preferred form of sealing) or a resilient element such as an endless elastic "O" ring (as shown for clarity of illustration). The housing plates 40 and 42 include spaced apart surfaces 40b and 42b extending from the flanges 40a and 42a to define a chamber 46. An opening 48 leads into the chamber to define a fluid inlet and an opening 50 leads out of the chamber to define a fluid outlet. The spout 38 also includes means, such as the cylindrical pivoting base 52, for attachment to any of a wide variety of faucets.

Figure 9:
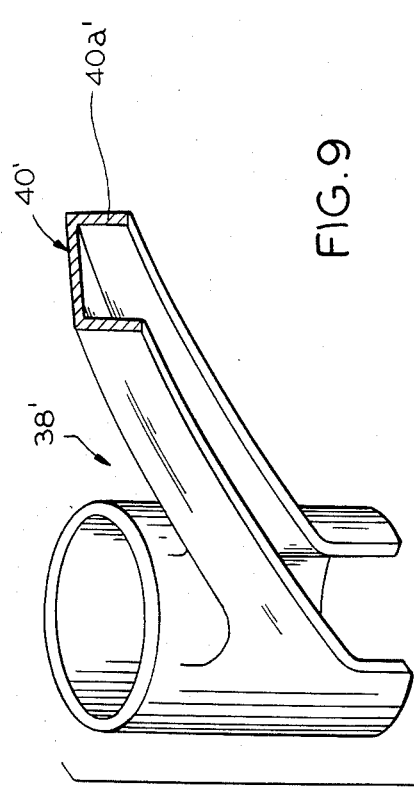
FIG. 9 is a partial exploded perspective view of an alternative spout manufactured in accordance with the present invention.
Figure 10:
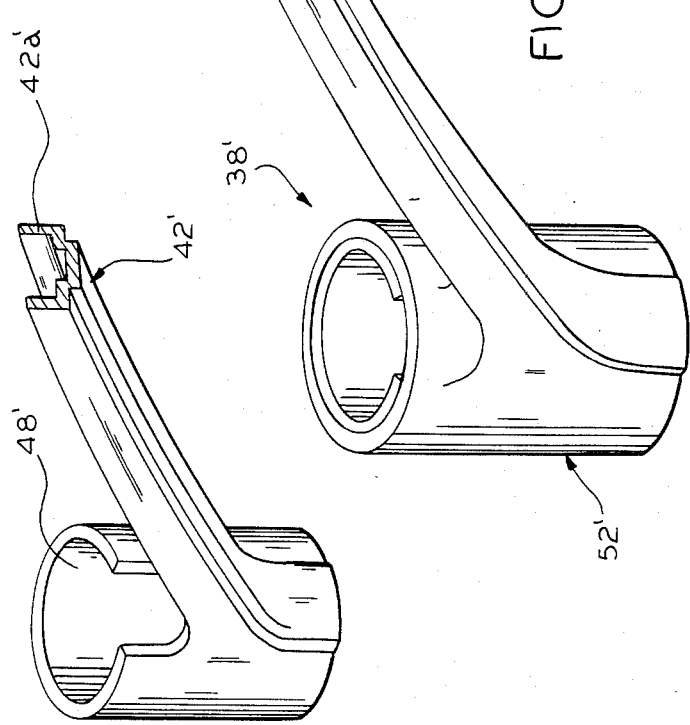
FIG. 10 is a perspective view of the alternative spout after completing assembly thereof.
Figure 11:
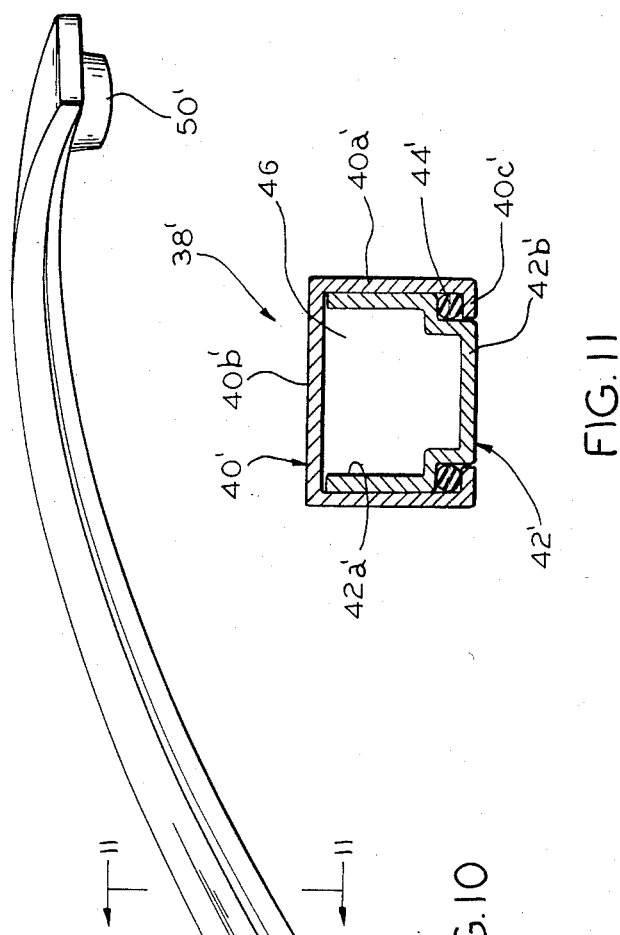
FIG. 11 is a cross sectional view taken on the line 11—11 of FIG. 10.

Referring to FIGS. 9 through 11, an alternative spout 38' is illustrated in some detail. The spout 38' includes a stamped upper housing plate 40' and a stamped lower housing plate 42'. A peripheral flange 40a' and 42a' is provided on each of the housing plates 40' and 42' such that the flanges 40a' and 42a' mate with a seal 44' (see FIG. 11) disposed between them in fluid sealing relationship. The housing plates 40' and 42' include spaced apart surfaces 40b' and 42b' extending from the flanges 40a' and 42a' to define a chamber 46'. An opening 48' leads into the chamber to define a fluid inlet and an opening 50' leads out of the chamber to define a fluid outlet. The spout 38' also includes means, such as cylindrical pivoting base 52', for attachment to any of a wide variety of faucets.

Upon comparison, it will be seen that the fundamental difference between the spouts 38 and 38' is the shape thereof. The cross sectional shape of the spout 38 is generally oval shaped whereas the cross sectional shape of the spout 38' is generally rectangular shaped and, as will be appreciated, this is accomplished by having the peripheral flange 42a' formed with an offset shoulder portion 42c'. With this construction, the lip 40c' may be folded over to compress the seal 44 against the offset shoulder portion 42c'.

The method of making a faucet or a component such as a spout includes the step of stamping a pair of housing plates having respective male and female interfitting flanges thereon. A continuous fluid sealing means is then applied to the outside of the male flange and the male flange is then inserted inside the female flange until the sealing means is in contact with both of the housing plates. The method also includes the step of folding the female flange reversely inwardly about the male flange to secure the pair of housing plates together.

With regard to the faucet, the housing plates are stamped to have spaced apart surfaces extending from the flanges to define a chamber after the pair of housing plates have been secured together. The housing plates are also stamped to have the juxtaposed openings in the spaced apart surfaces which are in communication with one another and the chamber. Moreover, the externally manipulable means is then secured to one of the openings in the housing plates and a fluid line is secured to the other of the openings in the housing plates in fluid sealing relationship.

While not shown in the drawings, the upper and lower housing plates of the faucet and/or the spout may have the peripheral flanges joined by numerous means. It is well within the invention, for instance, for the peripheral flanges to be brazed, soldered, welded, glued, and/or sealed by utilizing other heat sealing techniques, adhesives, and epoxys depending upon the application, e.g., such additional sealing may be desirable in high pressure applications such as those in which the faucet may be connected to a modern dishwasher. Moreover, as will be appreciated, the sealing technique utilized will depend upon the application for the faucet, the material being used for the faucet, and other such conventional considerations, all within the expertise of those skilled in the art.

Figure 15:
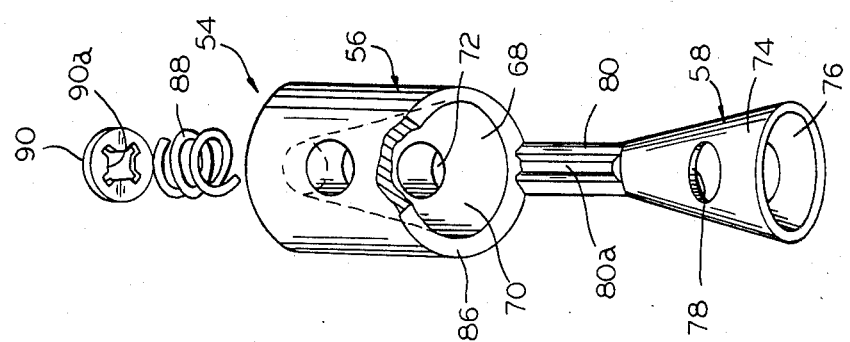
FIG. 15 is an exploded perspective view of a faucet insert in accordance with the present invention.
Figure 14:
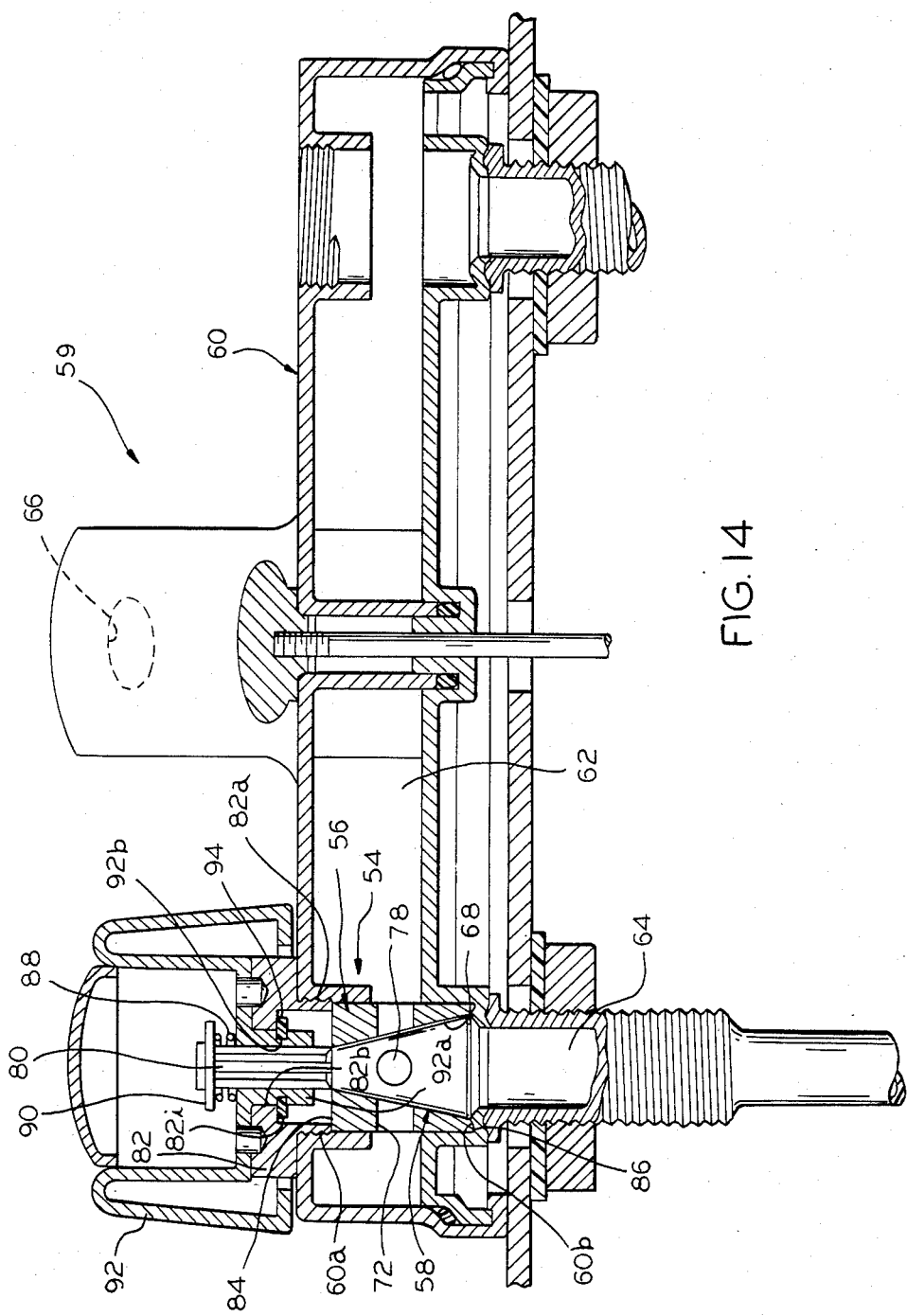
FIG. 14 is a cross sectional view of an installed faucet with integral spout utilizing a faucet insert in accordance with the present invention.

Referring now to FIGS. 14 and 15, a unique removable flow controlling insert or valving assembly 54 is illustrated having a housing member 56 and a valving member 58 rotatably received within the housing member. The insert 54, which may advantageously be utilized in place of a conventional valving assembly (such as 26 illustrated in FIG. 5), is suitable for use in a faucet 59 constructed in accordance with the present invention, (the faucet 59 being essentially identical to the faucet 10 illustrated in FIGS. 1 and 5 with the exception of the insert), although it will be appreciated that the insert 54 may suitably be applied to more conventional faucets, as well. In any case, the faucet need only have a body (such as 60), a fluid passageway through the body (such as 62), a fluid inlet leading to the fluid passageway (such as 64), and a fluid outlet leading from the fluid passageway (such as 66).

As shown, the housing member 56 has an opening 68 extending therethrough. The opening 68 is disposed adjacent the fluid inlet 64 and defines an internal conical surface 70 converging away from the fluid inlet. The housing member 56 also has port means 72 providing communication between the opening 68 and the fluid passageway 62 in the body 60.

Also, the valving member 58 is rotatably received within the opening 68 in the housing member 56. It will be appreciated that the valving member 58 has an external conical surface 74 adapted for mating engagement with the internal conical surface 70 of the housing member 56 and has a flow impact cavity 76 communicating with the fluid inlet 64 and extending within the valving member 58 at least as far as the port means 72 in the housing member 54 when the internal and external conical surfaces 70 and 74 are in engagement. The valving member 58 also has port means 78 providing communication between the flow impact cavity 76 and the port means 72 in the housing member 56.

Additionally, the stem 80 on the valving member 58 extends through the opening 68 in the housing member 54 remote from the fluid inlet 64. The stem 80 is adapted for non-rising rotation to reversibly align and misalign the port means 78 in the valving member 58 with the port means 72 in the housing member 54. The valving member 58 is thereby capable of selectively allowing and shutting off fluid flow through the faucet 10.

Referring in particular to FIG. 14, the faucet 59 includes means for maintaining the housing member 56 in position within the body 60 of the faucet, such as the screw cap 82. It will be seen that the screw cap 82 includes threads 82a adapted to cooperate with threads 60a in the body 60 whereby the screw cap 82 engages a portion of the housing member 56, such as the top 84 thereof. Also as shown, the body 60 may be provided with an annular lip 60b about which the bottom 86 of the housing member 56 is adapted to seat upon threadingly engaging the screw cap 82 with the top 84 of the housing member 56.

Still referring to FIG. 14, the faucet 59 includes means for biasing the internal and external conical surfaces 70 and 74 into sealing engagement, such as a spring washer or a coil spring 88 (as shown). The spring 88 is axially arranged on the stem 80 so as to cause engagement between the valving member 58 and the housing member 56, and the biasing means also includes retainer means, such as a stamped metal disk 90, which may be adjustably positioned on the stem 80. With this arrangement, the faucet 59 also also includes means for rotating the stem 80, such as the handle 92, positioned so that the spring 88 may be compressed on the stem 80 between the disk 90 and the handle 92.

As will be appreciated, the spring 88 generates an axial force effective to continuously maintain the internal and external conical surfaces 70 and 74 in sealing engagement. The stamped metal disk 90, which cooperates with the spring 88 to achieve this effect, preferably has spring fingers 90a. The spring fingers 90a extend radially inwardly to form an interference fit with stem 80 and, in addition, the handle 92 advantageously has splines formed to interfit with splines 80a on the stem 80. The handle 92 can then be slideably received on the stem 80 under the spring 88 so as to be urged against the screw cap 82. With this construction, the handle 92 may be manipulated by the user to affect the non-rising rotation of the stem 80.

Referring to FIG. 14, the stem 80 extends through an opening 82b in the screw cap 82 dimensioned larger than the stem 80 and the handle 92 has a neck 92a projecting through the opening 82a in the screw cap 82. It will also be seen that the handle 92 is retained by means cooperating with the neck 92a, such as the retaining clip 94, whereby the handle 92 is releasably held to the screw cap 82. Also as shown, the stem 80 extends through the neck 92a of the handle 92, and the retaining clip 94, which preferably comprises a split ring disposed in a groove 92b in the neck 92a, is positioned for engagement with an internal shoulder 82c of the screw cap 82.

In a preferred embodiment of the invention, the internal and external conical surfaces 70 and 74 of the housing and valving members 56 and 58 are constructed of plastic. It is also contemplated that at least one of the housing and valving members 56 and 58 may advantageously be contructed of solid molded synthetic or plastic materials such as those sold under the trademarks "Delrin" or "Teflon". Alternatively, the valving member 58 may be a metal stamping of a material such as brass or stainless steel in which case the external conical surface 74 is preferably coated with a plastic such as the ones sold under the trademarks "Delrin" or "Teflon".

As shown in FIG. 14, the port means 72 and 78 are 90° out of alignment. In this position, the removable flow controlling insert 54 prevents fluid flow through the faucet 59 because of the sealing engagement of the internal conical surface 70 which blocks the port means 78 thereby preventing flow of the pressurized fluid from the fluid inlet 64 from passing through the flow impact cavity 76 and which cooperates with the external conical surface 74 in sealing engagement to prevent the flow of pressurized fluid from the fluid inlet 64 between the two surfaces. When it is later desired to allow fluid flow through the faucet 59, the handle 92 is merely turned 90° which aligns the port means 72 and 78 and permits the pressurized fluid from the fluid inlet 64 to flow through the fluid impact cavity 76, the aligned port means 72 and 78, the fluid passageway 62, and out the fluid outlet 66.

Various changes coming within the spirit of the present invention may suggest themselves to those skilled in the art. Hence, it will be understood that the invention is not to be limited to the specific embodiments shown and described or the uses mentioned. On the contrary, the specific embodiments and uses are intended to be merely exemplary with the present invention being limited only by the true spirit and scope of the appended claims.

I claim:

1. A faucet, characterized by:
    a first housing member and second housing member connected together to form a fluid passageway therethrough having an inlet and outlet;
    said members each have complementary flanges which mate with each other and to form a sealed seam that extends along the length of said fluid passageway;
    said first member also having an aperture therethrough aligned with an aperture in the second member; said apertures in communication with said fluid passageway;
    operable valve means mounted in one of said apertures and the other of said apertures receiving a fluid line forming said inlet, with said valve means controlling fluid flow from said inlet and through said passageway to said outlet.

2. The faucet as defined by claim 1 wherein said complementary flanges are rigidly formed for being press fit into intimate association to establish a fluid tight seal.

3. The faucet as defined by claim 2 wherein said seal between said complementary flanges helping to establish said fluid tight seal is a semi-liquid adhesive applied between said peripheral flanges.

4. The faucet as defined by claim 3 wherein said semi-liquid adhesive has a surface tension sufficient to remain between said complementary flanges after being applied to fill the space therebetween.

5. The faucet as defined by claim 2 wherein said seal between said complementary flanges helping to establish said fluid tight seal is a resilient element compressed between said complementary flanges.

6. The faucet as defined by claim 5 wherein said resilient element is an endless elastic "O" ring.

7. The faucet as defined by claim 1 wherein said aperatures in said first and second housing members are annular flanges stamped out of said surfaces thereof.

8. The faucet as defined by claim 7 wherein said annular flanges are downturned from said surfaces of said first and second housing members.

9. The faucet as defined by claim 1 wherein said first and second housing members comprise mating halves having male and female engagement one with the other at said complementary flanges thereof.

10. The faucet as defined by claim 9 wherein said first and second housing members are sized relative to one another such that said male and female engagement is an interference press fit of about 0.002 to 0.005 inches.

11. The faucet as defined by claim 1 wherein said complementary flanges comprise a lip on one of said complementary flange on one of said first and second housing members adapted to be folded over the other said complementary flange on the other of said first and second housing members.

12. The faucet as defined by claim 1 wherein said complementary flanges comprise a downturned margin on one of said first and second housing members and a mating, upturned margin having a recess on the other of said first and second housing members.

13. The faucet as defined by claim 1 wherein the exposed surface of at least said first housing member is prefinished.

14. The faucet as defined by claim 1 wherein the exposed surface of at least said first housing member is polished.

15. The faucet as defined by claim 1 wherein the exposed surface of at least said first housing member is plated.

16. The faucet as defined by claim 1 wherein the exposed surface of at least said first housing member is painted.

17. The faucet as defined by claim 1 wherein the exposed surface of at least said is vinyl clad.

18. The faucet as defined by claim 1 wherein at least a portion of the exposed surface of at least said first housing member is covered by a cover plate.

19. The faucet as defined by claim 18 wherein said cover plate is prefinished differently than said first housing member.

20. The faucet as defined by claim 19 wherein said cover plate is of a material capable of being expanded over and releasably held to said first housing member.

21. The faucet as defined by claim 1 wherein said mating complementary flanges of said first and second housing members have parallel straight portions offset by conformably bent portions.

22. The faucet as defined by claim 21 wherein said seal comprises an endless elastic ring compressed between said conformably bent portions.

23. The faucet as defined by claim 21 wherein one of said mating complementary flanges has a lip with said lip being folded over the other of said complementary flanges.

24. The faucet as defined by claim 1 wherein said first and second housing members are formed of plastic, said complementary flanges being dimensioned to cooperate in interference fit fashion and being sealed to one another.

25. The faucet as defined by claim 24 including a continuous sealing channel adapted to receive the ends of said complementary flanges, said sealing channel being sealed in place by heat crimping to effect a seal at the ends of said peripheral flanges.

* * * * *